US012566994B2

(12) United States Patent
Lyons et al.

(10) Patent No.: US 12,566,994 B2
(45) Date of Patent: Mar. 3, 2026

(54) SYSTEMS AND METHODS TO CONFIGURE DEFAULTS BASED ON A MODEL

(71) Applicant: TOYOTA RESEARCH INSTITUTE, INC., Los Altos, CA (US)

(72) Inventors: Kent Lyons, Los Altos, CA (US); Charlene C. Wu, San Francisco, CA (US); Matthew Lee, Mountain View, CA (US); Rumen Iliev, Millbrae, CA (US); Yanxia Zhang, Foster City, CA (US); Yue Weng, San Mateo, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1156 days.

(21) Appl. No.: 17/365,423

(22) Filed: Jul. 1, 2021

(65) Prior Publication Data

US 2023/0004859 A1    Jan. 5, 2023

(51) Int. Cl.
| | |
|---|---|
| *G06N 20/00* | (2019.01) |
| *G06F 9/445* | (2018.01) |
| *G06F 16/28* | (2019.01) |

(52) U.S. Cl.
CPC ......... G06N 20/00 (2019.01); G06F 9/44505 (2013.01); G06F 16/285 (2019.01)

(58) Field of Classification Search
CPC .... G06N 20/00; G06F 9/44505; G06F 16/285
See application file for complete search history.

(56) References Cited

U.S. PATENT DOCUMENTS

| | | | |
|---|---|---|---|
| 8,706,310 B2 | 4/2014 | Barrilleaux | |
| 9,198,030 B2 * | 11/2015 | Karaoguz | ............. H04W 8/245 |
| 9,489,531 B2 | 11/2016 | Weiss | |
| 10,051,015 B2 | 8/2018 | Jonesmacfadden et al. | |
| 10,373,411 B2 | 8/2019 | Smith et al. | |
| 10,525,850 B1 | 1/2020 | Tang et al. | |
| 10,694,022 B1 | 6/2020 | Gupta | |
| 10,702,744 B2 | 7/2020 | Armour | |
| 10,817,804 B1 * | 10/2020 | Ozoka | .................... G06N 20/00 |
| 2008/0059214 A1 | 3/2008 | Vinberg et al. | |
| 2009/0172384 A1 * | 7/2009 | Anson | ................. G06F 9/44505 |
| | | | 713/100 |

(Continued)

FOREIGN PATENT DOCUMENTS

| | | | | | |
|---|---|---|---|---|---|
| CN | 102385705 A | * | 3/2012 | | |
| WO | WO-2012001215 A1 | * | 1/2012 | ............. | G06K 9/629 |
| WO | WO-2020168454 A1 | * | 8/2020 | | |

*Primary Examiner* — KC Chen
(74) *Attorney, Agent, or Firm* — Dinsmore & Shohl LLP

(57) ABSTRACT

A system and method for configuring a device includes using a machine learning model to generate a user behavior model based on user behavior data. The user behavior data may include time series data collected from user interactions with a first device, and the machine learning model may include a classification model configured to classify the user behavior data into the one or more classifications. A mapping may be created by training a machine learning model, using user behavior models from a plurality of users and device settings from the plurality of users, to identify one or more relationships between device settings and classifications of the user behavior data. The system and method configures one or more settings of a second device based on the user behavior model and the mapping.

15 Claims, 3 Drawing Sheets

(56)  References Cited

U.S. PATENT DOCUMENTS

| | | | | |
|---|---|---|---|---|
| 2009/0319456 A1* | 12/2009 | Consul | .................. | H04L 51/212 |
| | | | | 706/21 |
| 2014/0136451 A1* | 5/2014 | Marti | .................... | G06N 20/00 |
| | | | | 706/12 |
| 2015/0288800 A1 | 10/2015 | Pianese et al. | | |
| 2018/0025287 A1* | 1/2018 | Mathew | ................... | G06N 3/08 |
| | | | | 706/12 |
| 2018/0232528 A1* | 8/2018 | Williamson | ........... | G06N 5/025 |
| 2019/0130244 A1* | 5/2019 | Mars | ...................... | G06N 20/20 |
| 2019/0147356 A1* | 5/2019 | Peng | ...................... | G06N 3/088 |
| | | | | 706/21 |
| 2019/0349391 A1* | 11/2019 | Elsner | ................. | H04L 63/1425 |
| 2020/0007411 A1* | 1/2020 | Arar | ......................... | G06F 8/31 |
| 2020/0210647 A1* | 7/2020 | Panuganty | ............... | G06N 3/08 |
| 2020/0372406 A1* | 11/2020 | Wick | ...................... | G06N 20/00 |
| 2021/0065649 A1* | 3/2021 | Saa-Garriga | ............. | G09G 5/30 |
| 2021/0117436 A1* | 4/2021 | Zabel | ................... | G06F 16/258 |

* cited by examiner

SYSTEMS AND METHODS TO CONFIGURE DEFAULTS BASED ON A MODEL

TECHNICAL FIELD

The present specification generally relates to systems and methods for configuring devices and, more specifically, using machine learning to generate user behavior models for automated configuration of devices.

BACKGROUND

When a user initially uses an electronic device, some amount of configuration of the device is often necessary in order to accommodate user preferences. This configuration may be performed by the user directly changing device settings by interacting with a configuration interface or through a setup wizard that guides the user through the configuration process.

In situations such as sharing public devices or renting devices for temporary use, reconfiguring each device to user preferences becomes tedious. Although device settings may be copied from one device to another in situations where different devices share a sufficiently similar hardware configuration, different devices frequently have differences in hardware and configuration options that make direct copying of configuration settings impossible. Thus when a user initially uses a new, shared, or rented device, they must choose to either configure the device manually or through a setup wizard, or simply accept differences in the device behavior that are contrary to user preferences.

Accordingly, a need exists for alternative systems and methods of automatically configuring device settings.

SUMMARY

In one embodiment, a method for configuring a device includes using a machine learning model to generate a user behavior model based on user behavior data. The user behavior data may include time series data collected from user interactions with a first device, the user behavior model may include one or more classifications of the user behavior data, and the machine learning model may include a classification model configured to classify the user behavior data into the one or more classifications. The method may further include creating a mapping between user behavior classifications and one or more settings and configuring one or more settings of a second device based on the user behavior model and the mapping.

In another embodiment, the creating of the mapping further includes training a machine learning model, using user behavior models from a plurality of users and device settings from the plurality of users, to identify one or more relationships between device settings and classifications of the user behavior data.

In yet another embodiment, the method further includes receiving one or more responses to questions presented to the user, identifying a user goal based on the one or more responses, and using the identified user goal to modify the user behavior model.

In yet another embodiment, the method further includes training the machine learning model, using an unsupervised learning technique, to classify user behavior data of an individual user based on clustering identified in user behavior data of a plurality of individuals.

In yet another embodiment, the method further includes configuring application settings of an application installed on the device based on the user behavior model and the mapping.

Further embodiments include a computing device configured to perform the method steps of any of the methods described herein, and computer readable medium storing instructions that, when executed by the a processor, cause the processor to execute the method steps described herein.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
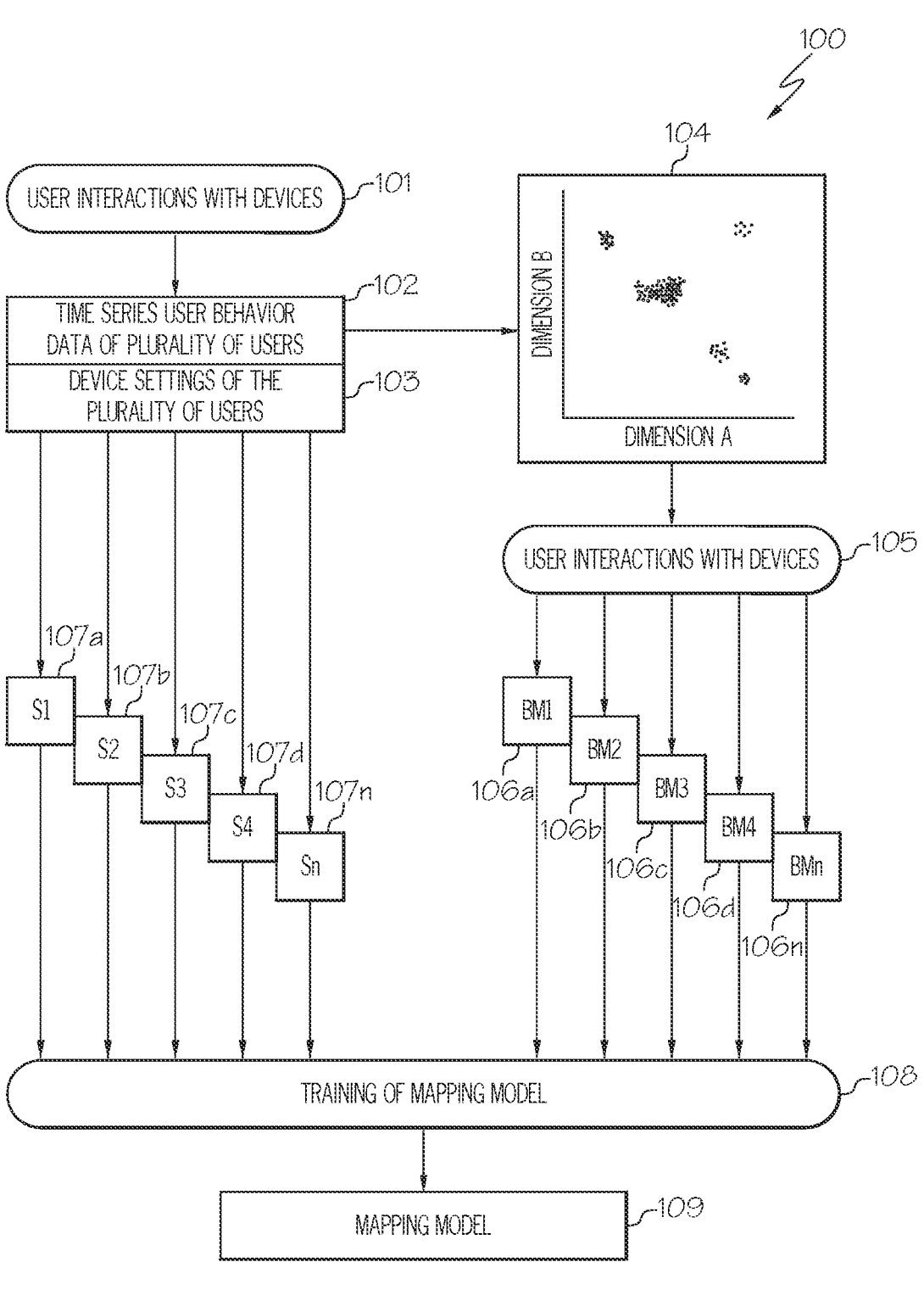
FIG. 1 depicts a flow chart of an example method for generating user behavior models using machine learning classification and creating a mapping model for mapping the user behavior models to device settings, according to one or more embodiments shown and described herein.

The purpose of the disclosed embodiments is to automatically configure the settings of a device based on a model of a person. The device may comprise a vehicle, a mobile device, a software application, a display, an audio output device, or any other electronic device or electronically controlled device that has configuration settings.

The closest technology either requires that a person manually configure a device, a previously configured device, or utilize a configuration process, such as a setup wizard, to configure the device. The disclosed embodiments comprise systems and methods that automatically make configuration decisions for a device based on a user behavior model of an individual, which may be the user of the device. The model of the person may be learned prior, does not need to be manually specified, and can be applied in a way consistent with the person's overall goals and desires.

The system and method first generate a user behavior model. The user behavior model may be created based on one or more of user behavior data collected from user interactions with other devices or preference questions presented to the user. User behavior data may be retrieved from a database of prior behaviors recorded about the user. The preference questions may be designed to extract long-term goals to be encompassed in the user behavior model. For example, the user might have certain goals they want to meet (e.g., saving money or spending less time on social media), so questions that feed into the user behavior model may override recorded user behavior to facilitate desired future behavior. The model may be created by utilizing machine learning.

A mapping between user behavior data or user behavior models and device settings may be used to automatically configure the device based on the a user behavior model. The mapping may be created based on user behavior data collected from a plurality of individuals interactions with a variety of devices. As a non-limiting example, a database of driving behaviors from many individuals (braking style, route selections, etc.) may be mapped onto vehicle settings (braking profiles, acceleration curves, navigation settings). When a new user interacts with the vehicle, the system and method may utilize data collected from the new user's interactions with another vehicle and automatically configure the current vehicle using the machine-learned mapping between user behavior and settings.

In another non-limiting example, related to mobile phones, one user may want to be more deliberate about their phone usage, while another user may want to stay on top of everything. These two different users would likely have different settings for their phone or potentially for each app. The system and method can utilize these individuals' past behaviors as input for generating user behavior models for each individual and provide likely defaults for any new installed apps consistent with their current usage or overall usage goals.

Various embodiments of the system and method for automatically configuring device settings will be described in more detail herein.

Referring now to FIG. 1, which depicts a flow chart 100 of generating user behavior models and a mapping model, a user may generate user behavior data by interacting with a one or more devices. According to some embodiments, the process of generating a user behavior model may begin with user interactions with devices 101. The devices referred to herein may comprise a vehicle, a mobile device, a personal computer, a wearable device, a display device, and audio output device, or any device with electronically configurable device settings. Devices my further include any electronic or electronically controlled device. These devices tend to include hardware components that can be monitored, logged, configured and controlled. Although user behavior data may come from a plurality of devices, for simplicity, examples will be described with reference to a first device.

User interactions with the first device may include any interaction that may be logged. If the first device is a mobile device with a touch interface, user interactions may comprise touching, tapping, dragging, and other gestures. User interactions may also include voice commands, biometric actions, time spent using different applications, user movements, or location data. If the first device is a vehicle, the interactions may comprise accelerating, braking, turning, or any user interactions with the vehicle systems. A person of ordinary skill in the art will understand that different devices may be capable of different interactions with the user and a user interaction, as used herein, is intended to include those interactions, without limitation.

Time series user behavior data of a plurality of users 102 may be extracted from the user interactions with devices 101. Each user may interact with the same first device or different devices that are copies of the first device with sufficient hardware similarities to record similar user interactions. As non-limiting examples, a plurality of users may interact with a single vehicle or a set of vehicles or the plurality of users may interact with a mobile device or a set of mobile devices. Thus, time series user behavior data of the plurality of users 102 may come from user interactions of a plurality of users with one or more devices.

This time series user behavior data of the plurality of users 102 may be processed using machine learning classification 105 to generate behavior models of the plurality of users. According to some embodiments, the machine learning classification 105 may use unsupervised learning 104, such as clustering, on the time series user behavior data of the plurality of users 102 to identify classifications of the user behavior data. For example, the system may create a machine learning classification model by monitoring large groups of users' behavior data. The large group of users may be broken down into different subgroups that appear to have similar goals. As such, users within the subgroups may have their devices configured similarly. Subgroups of users can be broken down in several different ways. For example, subgroups can be broken down by common behaviors, employer, occupations, recent purchases, entertainment choices, age, or any other distinguishing characteristic.

Although the unsupervised learning 104 of FIG. 1 illustrates identification of clustering on two dimensions, dimension A and dimension B, this is for illustration purposes only, and a person of ordinary skill in the art will recognize that three or more dimensions may be used to identify clustering and other unsupervised learning methods may be used. Unsupervised learning may comprise parametric or non-parametric unsupervised learning. As non-limiting examples, the unsupervised learning 104 may comprise clustering, neural networks, and latent variable learning models. The clustering methods may further comprise exclusive clustering, hierarchical clustering, overlapping clustering, probabilistic clustering, k-means, Gaussian mixture models, DBSCAN, and OPTICS algorithms. Latent variable learning methods may comprise expectation-maximization algorithms, method of moments, principal component analysis, independent component analysis, non-negative matrix factorization, and singular value decomposition.

The machine learning classification 105 of user behavior data generates a behavior model for each of the plurality of users. The behavior models are illustrated as BM1 106a, BM2 106b, BM3 106c, BM4 106d and BMn 106n in FIG. 1. According to some embodiments, these behavior models are used in combination with device settings in training a mapping model 108.

Device settings from the plurality of users 103 may also be collected from the one or more devices used to collect the user interactions with the devices 101. As a non-limiting example, device settings may be collected from configuration files stored in an a memory of the first device. Individual device settings, S1 107a, S2 107b, S3 107c, S4 107d and Sn 107n, may be extracted for each of the plurality of users. According to some embodiments, these device settings. S1 107a, S2 107b, S3 107c, S4 107d and Sn 107n, are used in combination with user behavior models, BM1 106a, BM2 106b, BM3 106c, BM4 106d and BMn 106n, in training a mapping model 108.

Training of the mapping model 108 may include supervised machine learning or statistical methods for identifying correlations in data. As a non-limiting example, the training of the mapping model 108 may comprise using supervised learning techniques with a classification model to classify one or more behaviors in the user behavior data into classifications of device settings. The behavioral models may be used as inputs when training the mapping model 108, and the settings may be used to determine and minimize an error in the outputs of the classification model. As another non-limiting example, the training of the mapping model 108 may comprise training a prediction model, using the behavior models and associated device settings, to predict the device settings based on the behavioral model as an input. A person of ordinary skill in the art will understand that one or more machine learning models may be used in the training of the mapping model 108.

The training of the mapping model, using user behavior data and device settings 108 generates a mapping model 109, which can then be used for generating device settings based on an input of a behavioral model. Once the mapping model 109 is generated, the mapping model 109 may be applied to any new user behavior model generated, based on user behavior data, using the machine learning classification 105.

In summary, a user may interact with a first device and generate user behavior data that can be classified, using machine learning, into a user behavior model. The behavior model may then be input into the mapping model 109. The mapping model may generate device settings for a second device, customized to the user's preferences, based on the user behavior model. The process using a user's interactions with a first device to generate a user behavior model used to automatically configure settings of a second device is described in greater detail with reference to FIG. 2.

Figure 2:
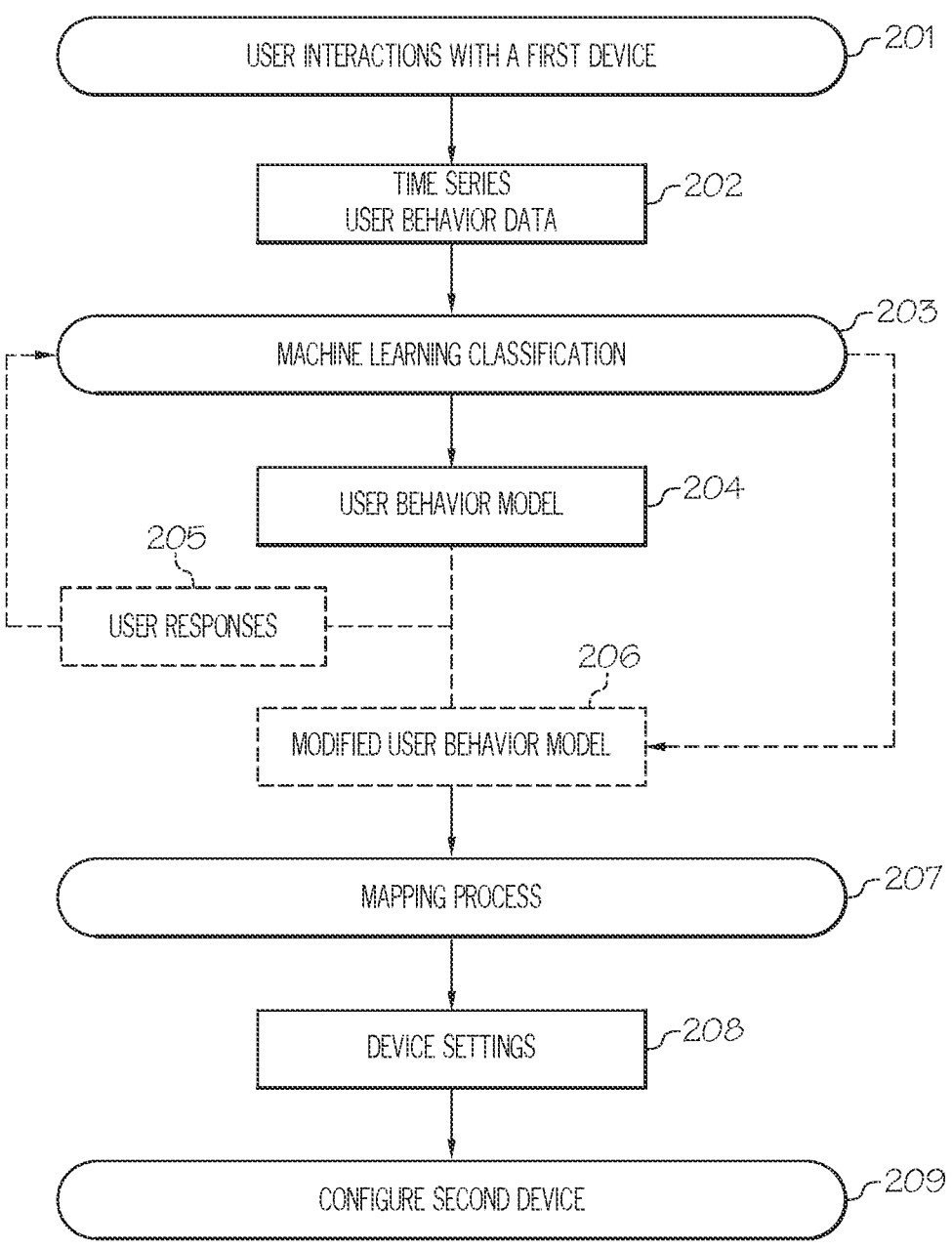
FIG. 2 illustrates a flow chart of an example method for configuring a second device based on a user behavior model created from user interactions with a first device, according to one or more embodiments shown and described herein.

FIG. 2 illustrates a flow chart of a method for configuring a second device based on a user behavior model created from user interactions with a first device, according to one or more embodiments shown and described herein. The method of FIG. 2 may be performed by any computing device, as described herein, or equivalents. First, the computing device collects user interactions with the first device 201. According to some embodiments, the user interactions may be collected and recorded by the first device or transmitted by the first device to a remote server for storage and/or processing. As a non-limiting example, the first device may comprise a vehicle, and user interactions with the first device may comprise acceleration and braking behavior. A processor may collect accelerator position data, brake pedal position data, and vehicle dynamics data such as speed, RPM, and g-forces in three dimensions. This time series user behavior data 202 comprises a representation of the user's preferences that may be inferred from the user's behavior as captured by interactions with the vehicle.

The user interactions with the first device 201 generate time series user behavior data. The user behavior data may comprise any type of data collected from user interactions, including, but not limited to, all inputs and outputs of the device with associated time stamps and/or durations.

The time series user behavior data 202 is processed through machine learning classification 203 to generate a user behavior model. Returning to the vehicle example, the user behavior model 204 generated based on time series user behavior data 202 gathered from user interactions with the vehicle comprises a representation of expected or desired behavior of the vehicle.

According to some embodiments, the computing device may optionally present questions to the user in order to identify user goals. The user goals may be used to modify the behavior model 204 to better achieve the user's desired device behavior. In the vehicle example, the questions may comprise questions about braking behavior (late braking, or early braking), desired driving behavior, comfort, or performance level. As further non-limiting examples, questions presented to the user may include questions about a user's desire to increase or decrease device usage, or questions about limiting the time of a particular application. User responses 205 to the questions may be used to generate a modified user behavior model 206. Alternatively, user responses 205 may be fed into the machine learning classification 203 in order to generate a modified user behavior model 206.

The user behavior model 204 may be input to the mapping process 207. The mapping process 207 may use a mapping model to generate device settings 208 for a second device based on the user behavior model 204 or the modified user behavior model 206. The second device is configured 209 based on the user behavior model 204 or the modified user behavior model 206 and the mapping process 207. Returning to the vehicle example, a second vehicle may be automatically configured to exhibit braking and acceleration behavior similar to the first vehicle, as defined by the user behavior model 204. The user behavior model 204 may capture user inputs and the vehicle response to user inputs, and the mapping process 207 may configure the second vehicle to respond similarly to the first vehicle when given similar inputs from the user.

As a further example, using the systems and methods described herein, a second user may use a second user behavior model to automatically configure the same device, such as a vehicle, to the second user's preferences. Thus any user that uses the device can have the device automatically configured to that user's preferences without using a setup wizard or resorting to manual configuration. The system and method may also partially configure the settings of the device based on the user behavior model 204 or the modified user behavior model 206. The system and method may prompt the user for a preferred setting for settings that are not set based on the model.

According to some embodiments, the first device may collect and store the time series user behavior data, and use a local or remotely-hosted machine learning classification service to generate the user behavior model. This user behavior model may be stored on the first device, or stored in remote storage. The user behavior model may then be copied to the second device, which may use the mapping process to generate device settings and configured the second device. A person of ordinary skill in the art will understand that the steps of collecting user behavior data, generating a user behavior model, and mapping the user behavior model to device settings may be performed using processors of the first device, the second device, a remote device, or any combination thereof.

Figure 3:
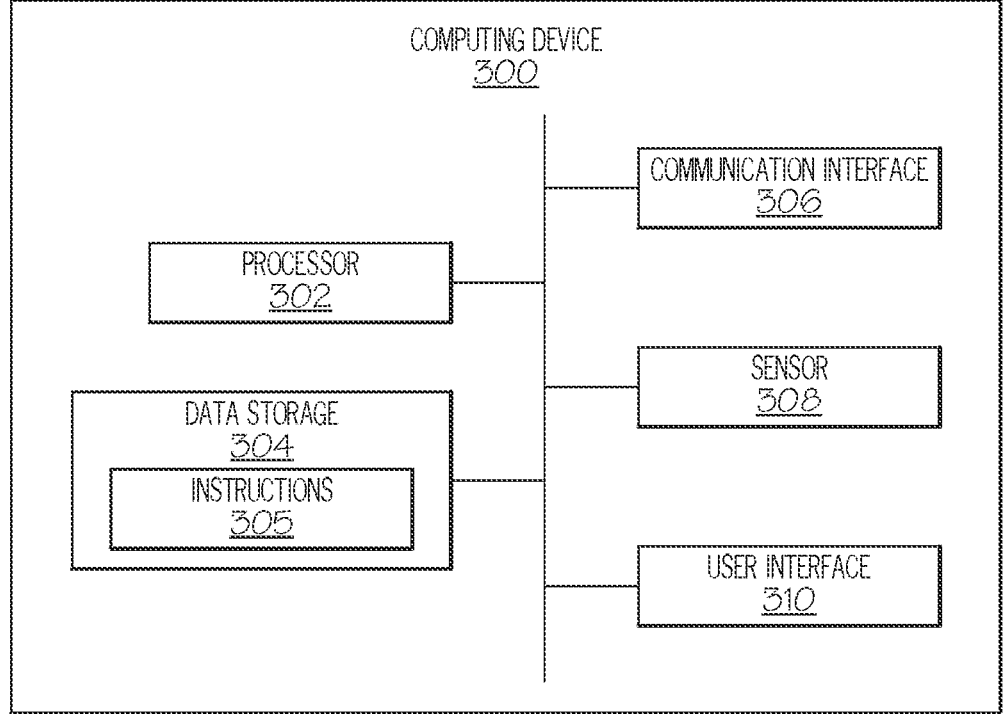
FIG. 3 depicts a block diagram of an example computing device suitable for implementing the automatic configuration methods, according to one or more embodiments shown and described herein.

FIG. 3 depicts a block diagram of a computing device suitable for implementing the automatic configuration methods, according to one or more embodiments shown and described herein. As shown, a computing device 300 may include a processor 302, and data storage 304 including instructions 305. The computing device may further include a communication interface 306, a sensor 308, and a user interface 310, each of which are communicatively connected via a system bus 312. Any component or combination of components of the disclosed embodiments may take the form of or include a computing device 300. It should be understood that computing device 300 may include different and/or additional components, and some or all of the functions of a given component could instead be carried out by one or more different components. Computing device 300 may take the form of (or include) a virtual computing device or one or more computing resources in a cloud computing environment. Additionally, computing device 300 could take the form of (or include) a plurality of computing devices of any form, and some or all of the functions of a given component could be carried out by any combination of one or more of the computing devices in the plurality.

Processor 302 may take the form of one or more general-purpose processors and/or one or more special-purpose processors, and may be integrated in whole or in part with data storage 304, communication interface 306, sensor 308, user interface 310, and/or any other component of computing device 300, as examples. Accordingly, processor 302 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 304 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 305 may be stored in data storage 304, and may include machine-language instructions executable by processor 302 to cause computing device 300 to perform the computing-device functions described herein. Additionally or alternatively, instructions 305 may include script instructions executable by a script interpreter configured to cause processor 302 and computing device 300 to execute the instructions specified in the script instructions. According to some embodiments, the instructions include instructions executable by the processor to cause the computing device to execute an artificial neural network. It should be understood that instructions 305 may take other forms as well.

Additional data may be stored in data storage 304, such as databases, data structures, data lakes, and/or network parameters of a neural network. The additional data could be stored such as a table, a flat file, data in a file system of the data storage, a heap file, a B+ tree, a hash table, a hash bucket, or any combination of these, as examples.

Communication interface 306 may be any component capable of performing the communication-interface functions described herein, including facilitating wired and/or wireless communication between computing device 300 and another entity. As such, communication interface 306 could take the form of an Ethernet, Wi-Fi, Bluetooth, and/or USB interface, among many other examples. Communication interface 306 may receive data over a network via communication links, for instance.

Sensor 308 could take the form of one or more sensors operable to perform any of the data collection functions described herein. The sensor could be positioned on a vehicle, including an interior and/or exterior of a vehicle. Though sensor 308 may be referenced in the singular throughout this disclosure, it should be understood that sensor 308 may take the form of (or include) a single sensor or multiple sensors.

The sensor could include a radar sensor, a LIDAR sensor, a camera, an accelerometer, a speedometer, or any combination of these or other sensors. The radar sensor, LIDAR sensor, and/or camera may obtain signals (such as electromagnetic radiation) that can be used by computing device 300 to obtain information relevant to vehicle control. Additionally or alternatively, the accelerometer and the speedometer may be used to detect an acceleration and a speed of a vehicle. Sensor 308 may take other forms as well.

User interface 310 may be any component capable of carrying out the user-interface functions described herein. For example, the user interface may be configured to receive input from a user and/or output information to the user.

Output may be provided via a computer monitor, a loudspeaker (such as a computer speaker), or another component of (or communicatively linked to) computing device 300. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 310 may take numerous other forms as well.

System bus 312 may be any component capable of performing the system-bus functions described herein. In an embodiment, system bus 312 is any component configured to transfer data between processor 302, data storage 304, communication interface 306, sensor 308, user interface 310, and/or any other component of computing device 300. In an embodiment, system bus 312 includes a traditional bus as is known in the art. In other embodiments, system bus 312 includes a serial RS-232 communication link, a USB communication link, and/or an Ethernet communication link, alone or in combination with a traditional computer bus, among numerous other possibilities. In some examples, system bus 312 may be formed from any medium that is capable of transmitting a signal, such as conductive wires, conductive traces, or optical waveguides, among other possibilities. Moreover, system bus 312 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 312 may take various other forms as well.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for configuring a device, the method comprising:

using a machine learning model to generate a user behavior model based on user behavior data, wherein the user behavior data comprises time series data collected from user interactions of a user with a first device, wherein the first device is different from the device, wherein the user behavior model comprises one or more classifications of the user behavior data, and wherein the machine learning model comprises a classification model configured to classify the user behavior data into the one or more classifications;

creating a mapping between the one or more classifications and one or more settings, wherein the creating of the mapping comprises mapping the one or more classifications of the user behavior data to one or more device settings;

receiving one or more responses to questions presented by the first device to the user;

identifying a user goal of the user based on the one or more responses;

using the identified user goal to modify the user behavior model to advance the user goal; and automatically configuring one or more settings of the device to match one or more settings of the first device based on the user behavior model generated from user interactions with the first device and the mapping.

2. The method of claim 1, wherein the creating of the mapping further comprises training a machine learning model, using user behavior models from a plurality of users and device settings from the plurality of users, to identify one or more relationships between device settings and classifications of the user behavior data.

3. The method of claim 1, further comprising:

training the machine learning model, using an unsupervised learning technique, to classify user behavior data of an individual user based on clustering identified in user behavior data of a plurality of individuals.

4. The method of claim 1, wherein the user behavior model further comprises one or more sub-classifications of the user behavior data.

5. The method of claim 1, further comprising:

further configuring application settings of an application installed on the device based on the user behavior model and the mapping.

6. A system for configuring a device, the system comprising:

a processor; and memory storing instructions that, when executed by the processor, cause the processor to perform steps of:

using a machine learning model to generate a user behavior model based on user behavior data, wherein the user behavior data comprises time series data collected from user interactions of a user with a first device, wherein the first device is different from the device, wherein the user behavior model comprises one or more classifications of the user behavior data, and wherein the machine learning model comprises a classification model configured to classify the user behavior data into the one or more classifications;

creating a mapping between the one or more classifications and one or more settings, wherein the creating of the mapping comprises mapping the one or more classifications of the user behavior data to one or more device settings;

receiving one or more responses to questions presented by the first device to the user;

identifying a user goal of the user based on the one or more responses;

using the identified user goal to modify the user behavior model to advance the user goal; and automatically configuring one or more settings of the device to match one or more settings of the first device based on the user behavior model generated from user interactions with the first device and the mapping.

7. The system of claim 6, wherein the creating of the mapping further comprises training a machine learning model, using user behavior models from a plurality of users and device settings from the plurality of users, to identify one or more relationships between device settings and classifications of the user behavior data.

8. The system of claim 6, wherein the processor further performs steps of:

training the machine learning model, using an unsupervised learning technique, to classify user behavior data of an individual user based on clustering identified in user behavior data of a plurality of individuals.

9. The system of claim 6, wherein the user behavior model further comprises one or more sub-classifications of the user behavior data.

10. The system of claim 6, wherein the processor further performs steps of:

further configuring application settings of an application installed on the device based on the user behavior model and the mapping.

11. A non-transitory computer-readable medium storing instructions that, when executed by a processor, cause the processor to perform steps of:

using a machine learning model to generate a user behavior model based on user behavior data, wherein the user behavior data comprises time series data collected from user interactions of a user with a first device, wherein the first device is different from a device, wherein the user behavior model comprises one or more classifications of the user behavior data, and wherein the machine learning model comprises a classification model configured to classify the user behavior data into the one or more classifications;

creating a mapping between the one or more classifications and one or more settings, wherein the creating of the mapping comprises mapping the one or more classifications of the user behavior data to one or more device settings;

receiving one or more responses to questions presented by the first device to the user;

identifying a user goal of the user based on the one or more responses;

using the identified user goal to modify the user behavior model to advance the user goal; and automatically configuring standardizing one or more settings of the device to match one or more settings of the first device based on the user behavior model generated from user interactions with the first device and the mapping.

12. The non-transitory computer-readable medium of claim 11, wherein the creating of the mapping further comprises training a machine learning model, using user behavior models from a plurality of users and device settings from the plurality of users, to identify one or more relationships between device settings and classifications of the user behavior data.

13. The non-transitory computer-readable medium of claim 11, storing further instructions that, when executed by the processor, cause the processor to further perform steps of:

training the machine learning model, using an unsupervised learning technique, to classify user behavior data of an individual user based on clustering identified in user behavior data of a plurality of individuals.

14. The non-transitory computer-readable medium of claim 11, wherein the user behavior model further comprises one or more sub-classifications of the user behavior data.

15. The non-transitory computer-readable medium of claim 11, storing further instructions that, when executed by the processor, cause the processor to further perform steps of:

further configuring application settings of an application installed on the device based on the user behavior model and the mapping.

* * * * *